UNITED STATES PATENT OFFICE.

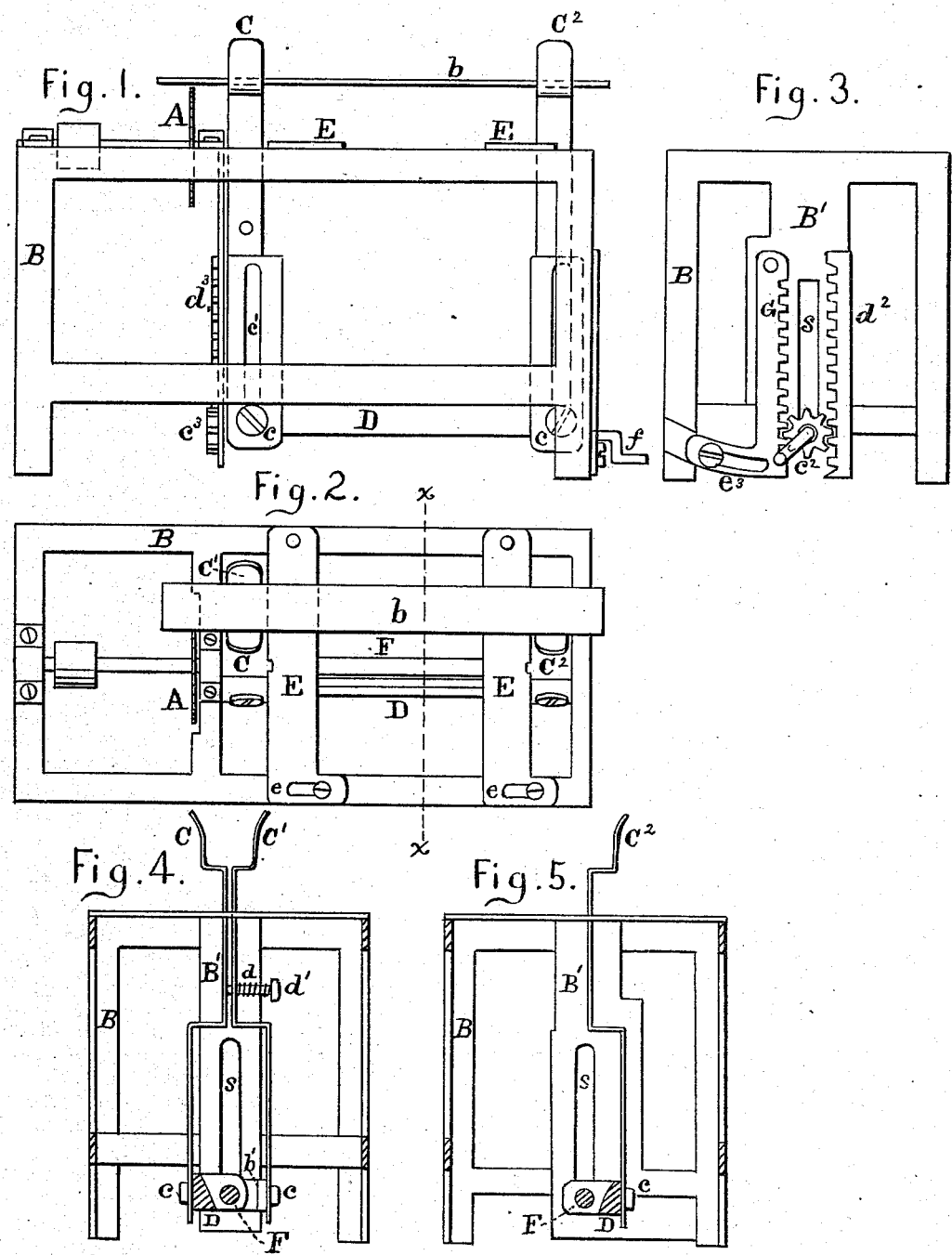

ANDREW B. KINGSBURY, OF UTICA, ASSIGNOR OF TWO-THIRDS HIS RIGHT TO WILLIAM DENT, OF MOHAWK, AND EDWIN L. KINGSBURY, OF HAMILTON, NEW YORK.

IMPROVEMENT IN MACHINES FOR CROZING STAVES.

Specification forming part of Letters Patent No. 159,551, dated February 9, 1875; application filed December 19, 1874.

*To all whom it may concern:*

Be it known that I, ANDREW B. KINGSBURY, of Utica, in the county of Oneida and State of New York, have invented certain new and useful Improvements in Machines for Crozing Staves; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1 is a side elevation; Fig. 2, a top view; Fig. 3, an end elevation. Figs. 4 and 5 are transverse sections on line $xx$ of Fig. 2.

My invention relates to crozing-machines; and consists of adjustable arms constructed to hold and carry staves of different widths over a crozing-saw, and arranged to oscillate on an adjustable shaft, so as to vary the length of the arms to adapt the machine for crozing staves for different-sized cisterns, as herein more fully described.

A is a crozing-saw, mounted on a frame, B. C $C^1$ $C^2$ are adjustable arms, the upper part of which is constructed to clamp and hold the staves $b$, and the lower part provided with slots $c^1$, and attached by screws $c$ through the slots to a movable bar, D, and holder $b'$. The arms C $C^1$ are rendered adjustable to different width staves by means of the movable holder $b'$ and the spiral spring $d$ on its holder $d^1$, which holder is attached to arm C, and passes through arm $C^1$. E E are adjustable bars, provided with slots $e$ $e$, to receive set-screws for holding the arms in place while the position of the adjustable bar D is being changed, to alter the length of the arms. F is a shaft, provided with a crank, $f$, and extends through lugs on the ends of bar D, and through holder $b'$, and through slots $s$ $s$ in standards B'. Pinions $c^2$ $c^3$ are arranged on the shaft F, to engage the teeth on plates $d^2$ $d^3$, for adjusting the position of the bar D in altering the length of the arms. G is an adjustable plate, provided with teeth and with a slotted arm, $e^3$, to receive a set-screw to lock pinion $c^2$, and thus hold in place the bar D.

The arms are adjusted so that their length from the point of their connection with bar D to the shoulder, on which the staves rest, will correspond with the length of the radius of the circle of the cistern, and the staves on the oscillating arms, in passing over the saw, will describe an arc of the circle of the cistern; and when the machine is to be adjusted for crozing staves for a different-sized cistern, the arms are clamped and held in place by the adjustment of the movable bars E E, and the screws $c$ being loosened, and the toothed plate G moved back from pinion $c^2$, the position of the bar D is changed by the crank upward, to shorten the arms for a smaller cistern, and downward to lengthen the arms for a larger cistern; and the screws $c$ are again tightened and the plate G replaced and fastened by its set-screw, thus holding the arms and bar securely in place.

What I claim as new, and desire to secure by Letters Patent in a crozing-machine, is—

1. In combination with a crozing-saw, the adjustable arms C $C^1$ $C^2$, arranged to oscillate on a central adjustable shaft or bar, substantially as and for the purposes described.

2. The combination of arms C $C^1$, movable holder $b'$, and spring $d$ on holder $d^1$, substantially as and for the purpose described.

3. In combination with arms C $C^1$ $C^2$, the adjustable bar D, shaft F, pinions $c^2$ $c^3$, toothed plates $d^2$, $d^3$, and G, substantially as and for the purposes described.

4. In combination with arms C $C^1$ $C^2$, the adjustable plates E E, having slots $e$ $e$, substantially as and for the purpose described.

In testimony that I claim the foregoing as my own invention I affix my signature in presence of two witnesses.

ANDREW B. KINGSBURY.

Witnesses:
WM. DENT,
JOHN M. HAHN.